(12) United States Patent  (10) Patent No.: US 7,663,351 B2
Korsunsky  (45) Date of Patent: Feb. 16, 2010

(54) SYNCHRONIZATION CIRCUITRY FOR MULTIPLE POWER CONVERTERS COUPLED AT A COMMON NODE

(75) Inventor: Roman Korsunsky, Downingtown, PA (US)

(73) Assignee: Texas Instruments Incorporated, Dallas, TX (US)

( * ) Notice: Subject to any disclaimer, the term of this patent is extended or adjusted under 35 U.S.C. 154(b) by 78 days.

(21) Appl. No.: 11/512,851

(22) Filed: Aug. 30, 2006

(65) Prior Publication Data

US 2008/0054866 A1  Mar. 6, 2008

(51) Int. Cl.
*G05F 1/00* (2006.01)
(52) U.S. Cl. ........................... 323/271; 323/269
(58) Field of Classification Search ................. 323/272, 323/271, 269; 700/286
See application file for complete search history.

(56) References Cited

U.S. PATENT DOCUMENTS

| | | | | |
|---|---|---|---|---|
| 3,619,669 A | * | 11/1971 | Wheeler | 327/265 |
| 3,971,972 A | * | 7/1976 | Stich | 318/811 |
| 4,041,368 A | * | 8/1977 | Gritter | 322/47 |
| 5,481,227 A | * | 1/1996 | Komori et al. | 331/2 |
| 6,177,845 B1 | * | 1/2001 | Moll | 331/49 |
| 6,433,522 B1 | * | 8/2002 | Siri | 323/272 |
| 6,456,170 B1 | * | 9/2002 | Segawa et al. | 331/143 |
| 6,985,799 B2 | * | 1/2006 | Zalesski et al. | 700/286 |
| 7,064,526 B2 | * | 6/2006 | Patterson | 322/46 |
| 7,173,835 B1 | * | 2/2007 | Yang | 363/89 |
| 2004/0189266 A1 | * | 9/2004 | Miura et al. | 323/271 |
| 2004/0230343 A1 | * | 11/2004 | Zalesski | 700/297 |
| 2005/0134336 A1 | * | 6/2005 | Goldblatt et al. | 327/156 |

* cited by examiner

*Primary Examiner*—Edward Tso
*Assistant Examiner*—Arun Williams
(74) *Attorney, Agent, or Firm*—John J. Patti; Wade J. Brady, III; Frederick J. Telecky, Jr.

(57) ABSTRACT

Synchronization circuitry and synchronization system for synchronizing converters/controllers that are electrically-coupled to a common synchronization node. The synchronization system includes synchronization circuitry, oscillation circuitry, and a leading edge detector and pulse generator. The synchronization circuitry includes pull-up circuitry and pull-down circuitry for generating a voltage pulse-train at the synchronization node. The oscillation circuitry controls which of the pull-up and the pull-down circuitry is driven ON and which is driven OFF.

20 Claims, 4 Drawing Sheets

SYNCHRONIZATION CIRCUITRY FOR MULTIPLE POWER CONVERTERS COUPLED AT A COMMON NODE

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

The present invention relates to power electronics and, more particularly, to a bi-directional, single-wire, synchronization circuit and system for plural, electrically-coupled power converter/controllers.

Commonly, when plural power converter/controllers, e.g., DC/DC power converter/controllers, are connected in parallel or in groups, an external master clock provides frequency synchronization. Alternatively, one of the power converter/controllers is structured and arranged as a "master", creating a "master-slave" relationship with the other converter/controllers, to provide frequency synchronization.

Therefore, it would be desirable to provide a simple, single-line, bi-directional frequency synchronization system that does not require external devices and/or that does not require designating any one, specific converter/controller as a "master" converter/controller.

SUMMARY OF THE INVENTION

The present invention provides a device, a system, and a method for synchronizing a plurality of power converter/controllers that is electrically-coupled at a common synchronization node. The system includes synchronization circuitry, having pull-up circuitry and pull-down circuitry; a rising-edge detector and pulse generator; and oscillation circuitry, having a latch, a first comparator for setting the latch, a second comparator for resetting the latch, and an RC network that charges and discharges depending on the state of latch.

An input port of the latch of the oscillation circuitry is electrically-coupled to an output port of the rising-edge detector and pulse generator and to an output port of the first comparator. The output port of the latch is electrically-coupled to the gate of a switching device controlling the RC network. When the latch is "set" by the rising-edge detector and pulse generator or by the first comparator, the gate of the switching device of the RC network is driven high (ON). When the switching device is ON, the capacitive element discharges to ground via the switching device. When the switching device is driven low (OFF), the charging resistor of the RC network charges the capacitive element. The capacitive element of the RC network continues to discharge until the latch is "reset" by the output of the second comparator.

The synchronization circuitry includes pull-up circuitry having a pull-up switching device and a pull-up resistive element and pull-down circuitry having a pull-down switching device and a pull-down resistive element. The gates of the pull-up and pull-down switching devices are each electrically-coupled to the output of an inverter circuit, which is electrically-coupled to the output of the first comparator. The pull-down switching device has an opposite polarity than the pull-up switching device. Hence, one of the pull-up or pull-down circuitries is driven high (ON) and the other is driven low (OFF) at any point in time. The impedance or rated resistance of the pull-down circuitry is greater than the impedance or rated resistance of the pull-up circuitry by at least an order of magnitude.

BRIEF DESCRIPTION OF THE DRAWINGS

The invention will be better understood by reference to the following more detailed description and accompanying drawings where like reference numbers refer to like parts.

DETAILED DESCRIPTION OF THE INVENTION

Figure 1:
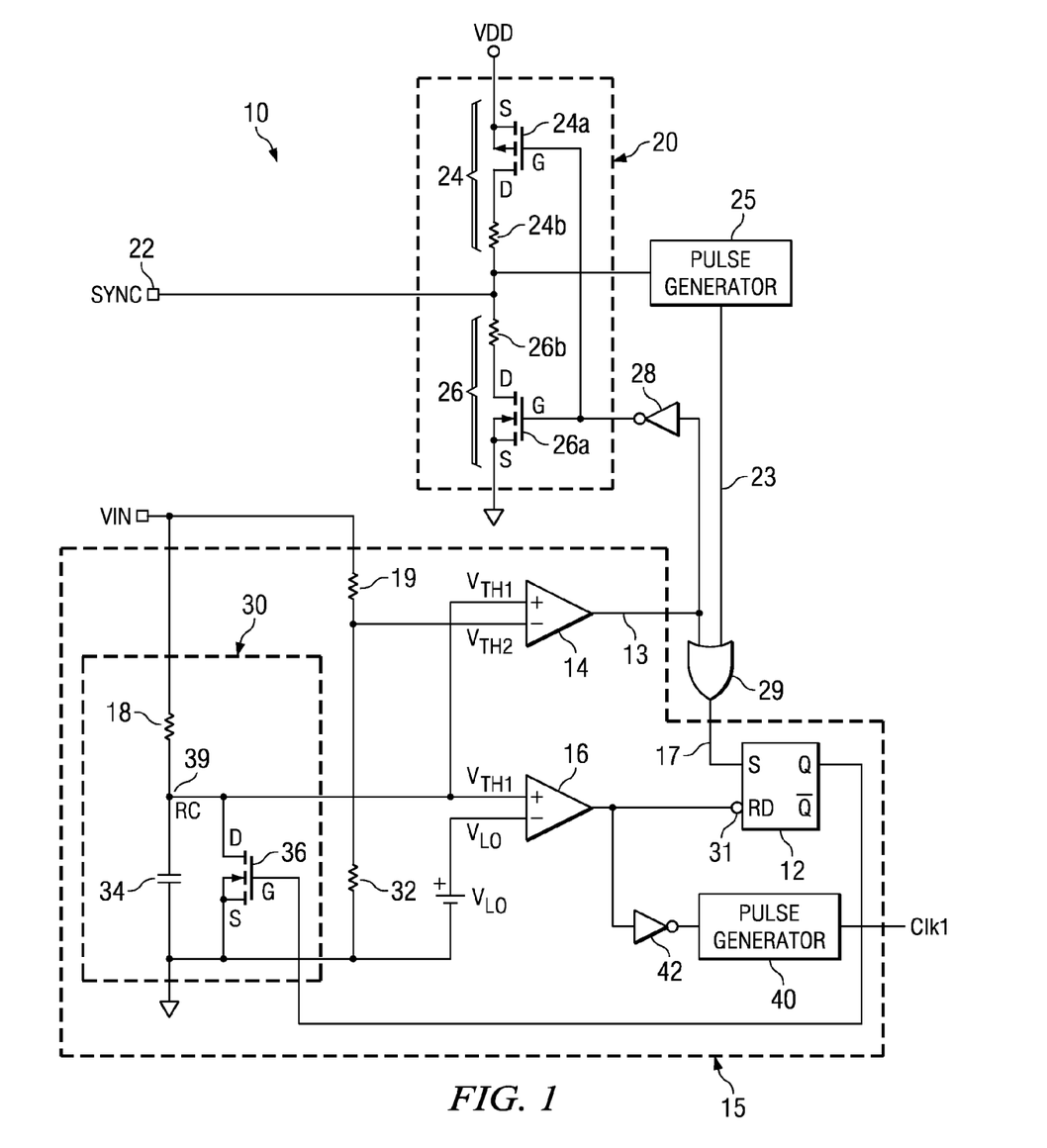
FIG. 1 is a circuit diagram of a single-channel oscillator and synchronization circuitry in accordance with the present invention.
Figure 2:
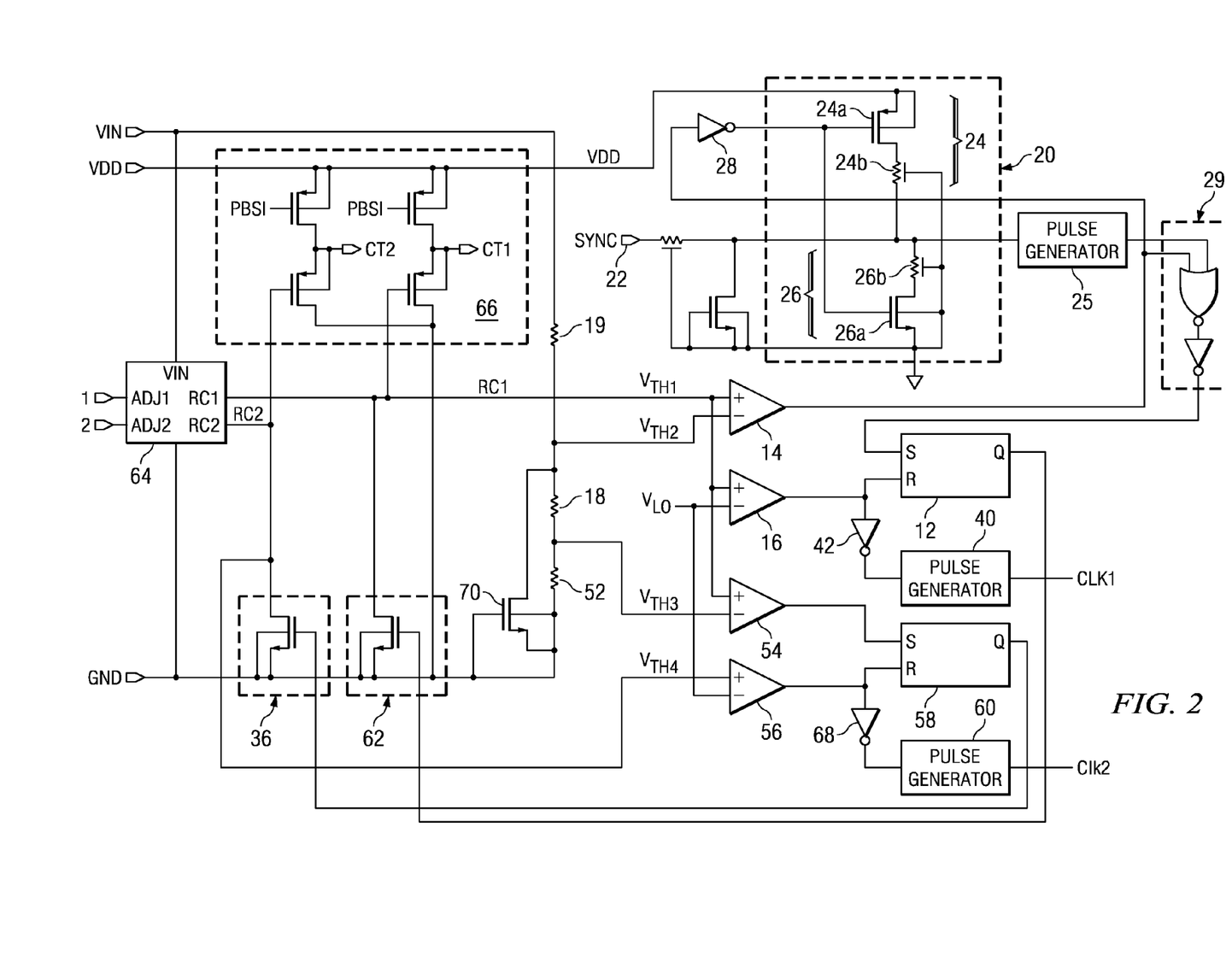
FIG. 2 is a circuit diagram of an implementation of the single-channel oscillator and synchronization circuitry of FIG. 1.

A system 10 and synchronization circuitry 20 for synchronizing a group or plurality of electrically-coupled power converter/controllers are disclosed. Referring to FIG. 1, the system 10 includes a single-channel oscillator, or oscillation circuitry 15, and synchronization circuitry 20. Each of the plurality of power converter/controllers (not shown) includes or is in operational association with the system 10 and/or with the synchronization circuitry 20. Moreover, the synchronization pins or nodes 22 associated with each of the synchronization circuits 20 of each of the plurality of power converter/controllers is electrically-coupled using a single wire. The system 10 components are also shown in the implementation circuit diagram shown in FIG. 2.

Synchronization Circuitry

The purpose of the synchronization circuitry 20 is to override the natural cycle of charge and discharge of the oscillation circuitry 15 of each converter/controller that is electrically-coupled to the synchronization node 22. The synchronization circuitry 20 includes resistive pull-up circuitry 24 and resistive pull-down circuitry 26. The resistive pull-up circuitry 24 include a semiconductor switching device 24a and a pull-up resistive element or resistor 24b. The switching device 24a is a PMOS MOSFET or other similar transistor switching device having a source electrode (s) electrically-coupled to a voltage source, $V_{DD}$, and a drain electrode (d) electrically-coupled to the pull-up resistor 24b. Those skilled in the art will appreciate that the switching device 24a could also be an NMOS MOSFET, in which case the source electrode (s) would be electrically-coupled to the pull-up resistor 24b and the drain electrode (d) would be electrically-coupled to the voltage source, $V_{DD}$.

The resistive pull-down circuitry 26 also include a semiconductor switching device 26a as well as a pull-down resistive element or resistor 26b. The switching device 26a is a NMOS MOSFET or other similar transistor switching device having a source electrode (s) electrically-coupled to ground and a drain electrode (d) electrically-coupled to the pull-down resistor 26b. Here again, those skilled in the art will appreciate that the switching device 26a could also be a PMOS MOSFET, in which case the source electrode (s) would be electrically-coupled to the pull-down resistor 26b and the drain electrode (d) would be electrically-coupled to ground. The polarity of the pull-up switching device 24a is opposite that of the pull-down switching device 26a.

The pull-up resistor 24b and the pull-down resistor 26b are electrically-coupled between the synchronization node 22 and an input of a rising edge detector and pulse generator circuit 25. For reasons that will be described in greater detail below, the impedance or rated resistance of the pull-down resistor 26b is at least an order of magnitude greater than the impedance or rated resistance of the pull-up resistor 24b. For example, the impedance or rated resistance of the pull-down resistor 26b is about 10 to about 20 times greater than the impedance or rated resistance of the pull-up resistor 24b.

The gates (g) of the switching devices 24a and 26a are electrically-coupled to each other as well as to the output of an inverter circuit 28. The input of the inverter circuit 28 is electrically-coupled to the output 13 of the first comparator 14 of the single-channel oscillator 15. Furthermore, because the switching devices 24a and 26a differ in their polarity, during operation of the synchronization circuitry 20 and of the system 10, the output of the inverter circuit 28 will either drive low (ON) the pull-up switching device 24a and drive low (OFF) the pull-down switching device 26a or will drive high (OFF) the pull-up switching device 24a and drive high (ON) the pull-down switching device 26a. As a result, voltage on synchronization node 22 will either be pulled-up or pulled-down depending on which of the two switching devices 24a and 26a is ON and which is OFF.

Oscillation Circuitry

The oscillator circuitry 15 of the system 10 includes an RC network 30 and latch circuitry 40. The RC network 30 includes a resistive element, or charging resistor, 18, a capacitive element 34, and a semiconductor switching device 36, e.g., an NMOS MOSFET. As shown in FIG. 1, the capacitive element 34 and the semiconductor switching device 36 are structured and arranged in parallel, between RC node 39 and ground. Resistive element 18 is structured and arranged between a voltage source, $V_{IN}$, and the RC node 39. The RC node 39 of the RC network 30 is electrically-coupled to the positive input ports (+) of the first and second comparators 14 and 16 of the latch circuitry 40.

The impedances or rated resistances of the switching device 36 and the charging resistor 18 are selected so that when the gate (g) of the switching device 36 is driven low (OFF), the impedance of the switching device 36 is much greater than the impedance of the charging resistor 18. Accordingly, when the switching device 36 is driven low (OFF), the charging resistor 18 provides charging current to the capacitive element 34. Furthermore, the impedances or rated resistance of the switching device 36 and the charging resistor 18 are selected so that when the gate (g) of the switching device 36 is driven high (ON), the impedance of the switching device 36 is much less than the impedance of the charging resistor 18. Accordingly, when the switching device 36 is driven high (ON), the capacitive element 34 discharges through the switching device 36 to ground.

The latch circuitry 40 includes a latch device 12, such as a SR-latch, a first comparator 14, and a second comparator 16. As will be discussed in greater detail below, the first comparator 14, e.g., an NMOS comparator, "sets" the latch device 12 when the voltage on the RC node 39 equals or exceeds a pre-determined, stable, threshold voltage, $V_{TH}$; and the second comparator 16, e.g., a PMOS comparator, "resets" the latch device 12 when the voltage on the RC node 39 equals or falls below a pre-determined, stable, low reference voltage, $V_{LO}$.

Each comparator 14 and 16 has at least two input ports: a positive input port (+) and a negative input port (−). The positive input ports (+) of the first and second comparators 14 and 16 are each electrically-coupled to the RC node 39 of the RC network 30. The voltage on the RC node 39 is charged by the voltage source, $V_{IN}$, via the charging resistor 18.

The negative input ports (−) of the first and second comparators 14 and 16 are each electrically-coupled to separate, stable voltage sources. The voltage source shown in FIG. 1 comprises a voltage source, $V_{IN}$, and two resistive elements 19 and 32 in series, i.e., a voltage divider.

The voltage at the negative input port (−) of the first comparator 14 is a pre-determined, stable, threshold voltage, $V_{TH}$. Those skilled in the art will appreciate that the threshold voltage, $V_{TH}$, will be determined by the impedance or rated resistance relationship between the two resistive elements 19 and 32 and by the input voltage at the voltage source, $V_{IN}$.

The voltage at the negative input port (−) of the second comparator 16 is a pre-determined, stable, low reference voltage, $V_{LO}$, provided by an internal voltage source.

The voltage, $V_+$, at the positive input ports (+) of the first and second comparators 14 and 16 is the voltage on RC node 39. By operation and design, the oscillation circuitry 15 only allows RC node 39 and the capacitive element 34 to be charged to a voltage set by the threshold voltage, $V_{TH}$. As soon as the voltage on the RC node 39 reaches the threshold voltage, $V_{TH}$, the first comparator 14 "trips", causing voltage on the RC node 39 and charge stored by the capacitive element 34 to discharge to ground via the switching device 36. Once the voltage on the RC node 39 equals or drops below the low, reference voltage, $V_{LO}$, the second comparator 16 "trips", driving the switching device 36 low (OFF), causing the capacitive element 34 to begin charging again.

More specifically, when the voltage at the positive input port, $V_+$, equals or exceeds the threshold voltage, $V_{TH}$, the first comparator 14 "trips", which is to say, changes from a low voltage (LO) state to a high (HI) voltage state. Thus, when "tripped", or when and while the voltage at the positive input port, $V_+$, equals or exceeds the threshold voltage, $V_{TH}$, the first comparator 14 outputs a high (HI) voltage signal.

The output 13 from the first comparator 14 is transmitted to the input of an inverter 28 and to one of the input ports of a logic OR-gate 29. The output 17 of the logic OR-gate 29 is electrically-coupled to the set (S) input port of the latch device 12.

The output 23 of the rising edge detector and pulse generator circuit 25 is electrically-coupled to the other input port of the logic-OR gate 29. Hence, either a high (HI) voltage signal from the first comparator 14 and/or a high (HI) voltage signal from the rising edge detector and pulse generator circuit 25 "sets" the latch 12, effectively driving the switching device 36 of the RC network 30 high (ON), causing the capacitive element 34 of the RC network 30 to discharge until the latch 12 is "reset" and the switching device 36 of the RC network 30 is driven low (OFF).

The positive input port (+) of the second comparator 16 is also electrically-coupled to the RC node 39 of the RC network 30. Hence, the voltage, $V_+$, at the positive input port (+) of the second comparator 16 is the same as the voltage, $V_+$, at the positive input port (+) of the first comparator 14.

As previously described, the negative input port (−) of the second comparator 16 is electrically-coupled to a pre-determined, low reference voltage, $V_{LO}$. The output 11 of the second comparator 16 is electrically-coupled to the reset (RD) input port of the latch device 12.

By operation and design, as long as the voltage at the positive input port, $V_+$, of the second comparator 16 exceeds the pre-determined, low reference voltage, $V_{LO}$, the second comparator outputs a high (HI) voltage signal, which that has no effect on a "set" latch 12. However, when the voltage at the positive input port, $V_+$, of the second comparator 16 equals or falls below the pre-determined, low reference voltage, $V_{LO}$, the second comparator 16 "trips", which is to say, changes from a high voltage (HI) state to a low (LO) voltage state.

When "tripped", the second comparator 16 outputs a low (LO) voltage signal. The output signal from the second comparator 16 is transmitted to the reset (RD) input port of the latch 12 via the output portion 11. An inverter 31 at the reset (RD) input port inverts the low (LO) voltage signal to a high (HI) voltage signal. The high (HI) voltage signal at the reset (RD) input port will "reset" the latch 12.

Method of Synchronizing Converter/Controllers

Having described a system 10 and synchronization circuitry 20 in accordance with the present invention, the operation of the system 10 and synchronization circuitry 20 will now be described for the purpose of describing a method of synchronizing the operating frequency of a plurality of converter/controllers that is electrically-coupled to a common synchronization node 22 by a single wire. The system 10 can perform a synchronization function either upon detection of an external voltage waveform rising edge (Case I) or, alternatively, internally, when the voltage on the RC node 39 equals or exceeds the pre-determined, threshold voltage, $V_{TH}$ (Case II).

Figure 6A:
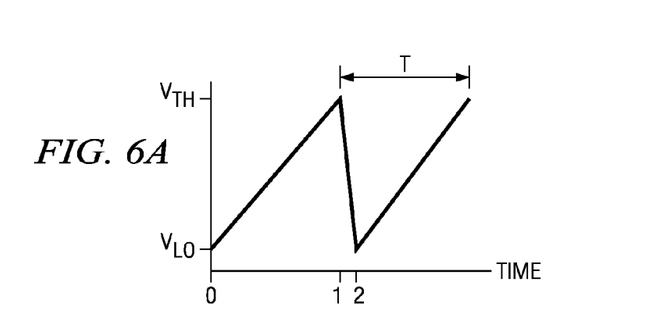
FIG. 6A is a diagram of a representative saw-toothed waveform at an RC node.
Figure 6B:
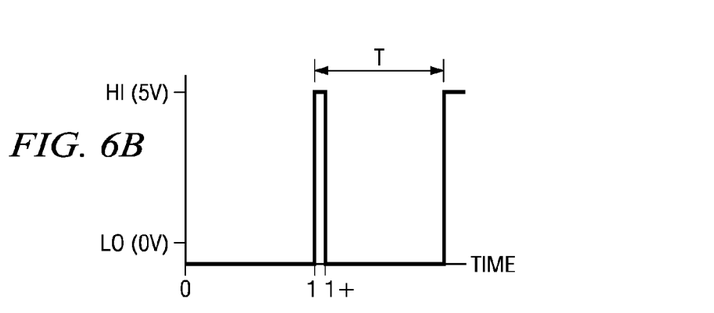
FIG. 6B is a diagram of a representative "quasi-digital" pulse train at the synchronization node.

Prior to describing the two synchronization cases, however, a brief discussion of the natural charging and discharging cycles associated with the oscillation circuitry 15 and the associated voltage pulse train at the synchronization node 22 will follow. Referring to FIGS. 6A and 6B, there are shown voltage waveforms associated with the RC node 39 and the synchronization node 22 of a single converter/controller, respectively.

In FIG. 6A, at RC node 39, at time t=0, the voltage on the RC node 39 corresponds to the pre-determined, low reference voltage, $V_{LO}$; the latch 12 is in a reset state; the semiconductor switching device 36 is driven low (OFF); and the RC network 30 of the oscillation circuitry 15 is in a charging state. Between time t=0 and time t=1, the charging resistor 18 charges the capacitive element 34.

At time t=1, when the voltage on the RC node 39 equals or exceeds the pre-determined threshold voltage, $V_{TH}$, the latch 12 is in a set state; the semiconductor switching device 36 is driven high (ON); and the RC network 30 of the oscillation circuitry 15 discharges voltage on the RC node 39 to ground. Discharge continues until the voltage on the RC node 39 again corresponds to the pre-determined, low reference voltage, $V_{LO}$, i.e., at time t=2.

At time t=2, the latch 12 is again in a reset state; the semiconductor switching device 36 is again driven low (OFF); and the RC network 40 of the oscillation circuitry 15 returns to the charging state. Thus, one full period (T) occurs between time t=0 and time t=2. The resulting voltage waveform at the RC node 39 is saw-toothed.

In FIG. 6B, at time t=0, the pull-down switching device 26a of the synchronization circuitry 20 is driven high (ON) and the pull-up switching device 24a is driven high (OFF). Consequently, the voltage at the synchronization node 22 is pulled down to ground, i.e., LO (0 volts). Between time t=0 and time t=1, the pull-down switching device 26a remains ON; the pull-up switching device 24a remains OFF; and the voltage at the synchronization node 22 remains LO (0 volts).

At time t=1, corresponding to when the voltage on the RC node 39 equals or exceeds the pre-determined, threshold voltage, $V_{TH}$, the first comparator 14 trips from a voltage LO to a voltage HI. When the first comparator 14 trips, the pull-up switching device 24a is driven low (ON) and the pull-down switching device 26a is driven low (OFF). Consequently, the voltage at the synchronization node 22 is pulled-up to $V_{DD}$, i.e., a voltage HI (5 volts).

Between time t=1 and time t=1⁺, while the oscillation circuitry 15 is discharging voltage on the RC node 39 to ground, the voltage on the synchronization node 22 remains HI. At time t=1⁺, corresponding to when the voltage on RC node 39 falls below the threshold voltage, $V_{TH}$, the LO voltage output from the first comparator 14 now drives the pull-down switching device 26a high (ON) and drives the pull-up switching device 24a high (OFF).

The resulting waveform (FIG. 6B) at the synchronization node 22 is a "quasi-digital", frequency pulse train having a narrow, relatively short duty cycle (between time t=1 and time t=1⁺). The period (T) of the pulse train is equal to the time between adjacent pulses. The frequency of the converter/controller is equal to the invert of the period (1/T).

Case I (Synchronization by Detection of an External Voltage Waveform Rising Edge)

When the rising edge detector portion of the rising edge detector and pulse generator 25 of a first converter/controller detects the rising edge of an external, pulse train voltage waveform caused by a second converter/controller, e.g., at the synchronization node 22, the pulse generator portion of the rising edge detector and pulse generator 25 of the first converter/controller generates a high (HI) voltage pulse. The high (HI) voltage pulse is transmitted to one of the input ports of the logic OR-gate 29 via output 23 and becomes a first input into the logic OR-gate 29. Regardless of the state (HI or LO) of the second input of the logic-OR gate 29, which is output from the first comparator 14, the logic-OR gate 29 generates a high (HI) voltage output.

The high (HI) voltage output from the logic OR-gate 29 is transmitted to the set (S) input port of the SR-latch 12. The high (HI) voltage at the set (S) input port "sets" the latch 12. Accordingly, the latch 12 outputs a high (HI) (Q=1) voltage output signal.

This high (HI) (Q=1) voltage output signal is transmitted to the gate (g) of the semiconductor switching device 36 of the RC network 30. The high (HI) voltage signal at the gate (g) of the switching device 36 drives the gate (g) high (ON), causing the RC network 30, or, more particularly, the capacitive element 34 of the RC network 30 to begin discharge to ground via the switching device 36, instantaneously.

Figure 6C:
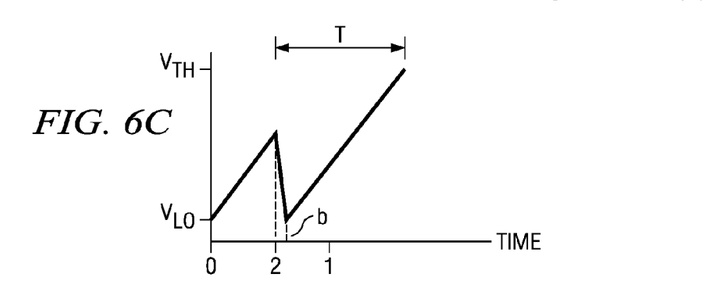
FIG. 6C is a diagram of a representative waveform at an RC node that discharges before reaching the threshold voltage.

When discharge is caused by the rising edge detector and pulse generator 25 and not by the voltage on the RC node 39 equaling or exceeding the pre-determined, threshold voltage, $V_{TH}$, the voltage on the RC node 39 at the instant of discharge may be anywhere between the pre-determined, threshold voltage, $V_{TH}$, and the pre-determined, low reference voltage, $V_{LO}$. This condition is shown in FIG. 6C. Because the rising edge detector and pulse generator 25 can detect a rising edge of a pulse train waveform on the synchronization node 22 from any of the other electrically-coupled converter/controllers, the rising edge can be out of phase with the other converter/controllers until synchronization is effected.

In such instances, referring to FIG. 6C, when the gate (g) of the switching device 36 is driven high (ON) at time t=a, where time t=a is less than time t=1, corresponding to the voltage at the RC node 39 equaling or exceeding the pre-determined voltage threshold, $V_{TH}$, the voltage on the RC node 39 begins to decrease as the voltage discharges to ground via the switching device 36.

At time t=b, corresponding to the time at which the voltage on RC node 39 is less than or equal to the pre-determined low reference voltage, $V_{LO}$, the gate (g) of the switching device 36 is driven low (OFF) and the capacitive element 34 begins charging via resistor 18 again at a frequency at or near the frequency of converter/controller whose voltage pulse train waveform was initially detected by the rising edge waveform detector and pulse generator 25.

The following description, for ease of understanding, presumes that the rising edge detector and pulse generator 25 of a first converter/controller detects a rising edge of a pulse train waveform from a second converter/controller on the common synchronization node 22 prior to the RC network 40 of the first converter/controller reaching its pre-determined, threshold voltage, $V_{TH}$. As previously described, the voltage on the RC node 39 becomes input at the positive input ports (+) of both the first 14 and the second comparators 16. Because the voltage on the RC node 39 at the instant of discharge does not equal or exceed the pre-determined, voltage threshold, $V_{TH}$, the first, NMOS-type comparator 14 will continue to output a low (LO) voltage signal.

A low (LO) voltage signal from the first comparator 14 has no effect on the latch 12. At the inverter 28, however, the low (LO) voltage signal from the first comparator 14 is inverted to a high (HI) voltage signal. The high (HI) voltage output signal from the inverter 28 drives the gate (g) of the pull-up switching device 24a high (OFF) and drives the gate (g) of the pull-down switching device 26a high (ON).

Thus, the rising edges of the pulse train waveforms of all of the converter/controllers are synchronized, i.e., in phase. More specifically, the frequencies of all converter/controllers are synchronized at the highest running frequency.

Furthermore, at the second, PMOS-type comparator 16, the voltage on the RC node 39 during discharge is compared to the predetermined, low reference voltage, $V_{LO}$. As long as the voltage, $V_+$, at the positive input port (+) of the second comparator 16 is greater than the pre-determined, low reference voltage, $V_{LO}$, at the negative input port (−), the output of the second comparator 16 is a voltage high (HI).

The output signal from the second comparator 16 is transmitted to the "reset" (RD) input port of the latch 12 via output 11. A high (HI) voltage signal, which is inverted to a low (LO) voltage state by the inverter 31, at the reset (RD) input port does not change the state of the latch 12 from "set" to "reset". Hence, the latch 12 continues to output high (HI) voltage signals to the gate (g) of the switching device 26 of the RC network 30. As a result, the RC network 30 will continue to discharge voltage on the RC node 39 to ground.

Discharge continues until the voltage on the RC node 39 is less than or equal to the pre-determined, low reference voltage, $V_{LO}$, at the second comparator 16. Once the voltage at the RC node 39 equals or falls below the $V_{LO}$ value, the PMOS-type comparator 16 outputs a low (LO) voltage signal. The low (LO) voltage output signal transmitted to the latch 12 via output 11 is inverted to a voltage high (HI) signal, which "resets" the latch 12. When and while the latch 12 is in a "reset" state, the latch 12 outputs a low (LO) voltage signal (Q=0) until it is "set" again.

The low (LO) voltage signal from the latch 12 drives the gate (g) of the switching device 36 low (OFF), causing the capacitive element 34 of the RC network 30 to begin charging again. Re-charging will continue again until another waveform rising edge is detected or until some other operation "sets" the latch 12.

Case II (Internal Synchronization)

Referring to FIGS. 6A and 6B, whenever and while the rising edge detector portion of the rising edge detector and pulse generator 25 fails to detect an external, pulse train waveform rising edge from another converter/controller electrically-coupled to the synchronization node 22, the pulse generator portion does not transmit any pulses or, alternatively, transmits a low (LO) voltage pulse. As a result, the input from the rising edge detector and pulse generator 25 at the logic OR-gate 29 is low (LO) voltage, which, by itself, cannot change the state of, i.e., "set", the latch 12.

However, while the semiconductor switching device 36 of the RC network 30 is driven low (OFF), the charging resistor 18 provides charging current from the voltage source, $V_{IN}$, to the capacitive element 34, which stores more and more electrical charge. At time t=1, barring earlier detection of a rising edge, the voltage potential on the RC node 39, i.e., the voltage, $V_+$, at the positive input port (+) of the first comparator 14 and at the positive input port (+) of the second comparator 16, will approach and eventually equal or exceed the pre-determined threshold voltage, $V_{TH}$, at the first comparator 14.

At the first, NMOS-type comparator 14, when the voltage on RC node 39 equals or exceeds the stable, pre-determined, threshold voltage, $V_{TH}$, and for as long as the RC node voltage exceeds the pre-determined, threshold voltage, $V_{TH}$, the first comparator 14 "trips", which is to say, changes state from a low (LO) voltage state to a high (HI) voltage state, outputting a high (HI) voltage signal.

The high (HI) voltage signal from the first comparator 14 is transmitted to one of the input ports of the logic OR-gate 29 and also to the inverter 28 via output 13. The logic OR-gate 29 outputs a high (HI) voltage signal to the latch 12, which "sets" the state of the latch 12. The "set" latch 12 outputs high (HI) voltage signals to the gate (g) of the switching device 36, which drives the switching device 36 high (ON), which causes the voltage at the RC node 39 to discharge to ground.

The "set" latch 12 continues to output high (HI) voltage signals to the gate (g) of the switching device 36 until the latch 12 is "reset". Hence, the capacitive element 34 of the RC network 30 continues to discharge until the latch 12 is "reset" and the gate (g) of the switching device 36 is driven low (OFF). As previously described above, the capacitive element 34 of the RC network 30 will continue to discharge until the voltage on the RC node 39 equals or falls below the pre-determined, low reference voltage, $V_{LO}$, at time t=2.

The inverter 28 inverts the high (HI) voltage signal from the first comparator 14 to a low (LO) voltage signal. The low (LO) voltage signal is transmitted to the gates (g) of both the pull-up switching device 24a and the pull-down switching device 26a. Because the voltage output signal at each gate (g) is LO, the PMOS MOSFET 24a is driven low (ON) and the NMOS MOSFET 26a is driven low (OFF). With the PMOS MOSFET 24a driven low (ON), the pull-up switching device 24a, voltage on the synchronization node 22 is pulled up.

The pull-up resistive element 24b of the pull-up circuitry 24, which has at least an order of magnitude lower impedance than the pull-down resistive element 26b of the pull-down circuitry 26 of all of the plurality of power converter/controllers, synchronizes each of the plurality of power converter/controllers that are electrically-coupled to the synchronization node 22 by sending a "quasi-digital" pulse signal, the rising edge of which is detected by the rising edge detection portions of the rising edge detection and pulse generators 25 of the other converter/controllers electrically-coupled to the synchronization node 22 (Case I).

Pulling-up voltage on the synchronization node 22 causes the frequencies on all converter/controllers that are electrically-coupled to the synchronization node 22 to synchronize automatically. Thus, the pull-up circuitry 24 of any converter/controller can synchronize all of the converter/controllers that are electrically-coupled to the common synchronization node 22 because the impedances or rated resistances of the pull-down resistors 26*b* are an order of magnitude, e.g., about 10-20 times, greater than the impedances or rated resistances of any one pull-up resistor 24*b*. Accordingly, a pre-designated master-slave relationship is not necessary.

The synchronization node 22 of the present invention is bi-directional, which is to say that it can serve as an input, for example, when, as described above, it transmits a riding edge waveform to the rising edge detector and pulse generator 25 of one or more converter/controllers, and it can serve as an output, for example when the first comparator 14 outputs a high (HI) voltage signal to the inverter 28, causing the pull-up circuitry 24 to pull-up current from the synchronization node 22.

Figure 3A:
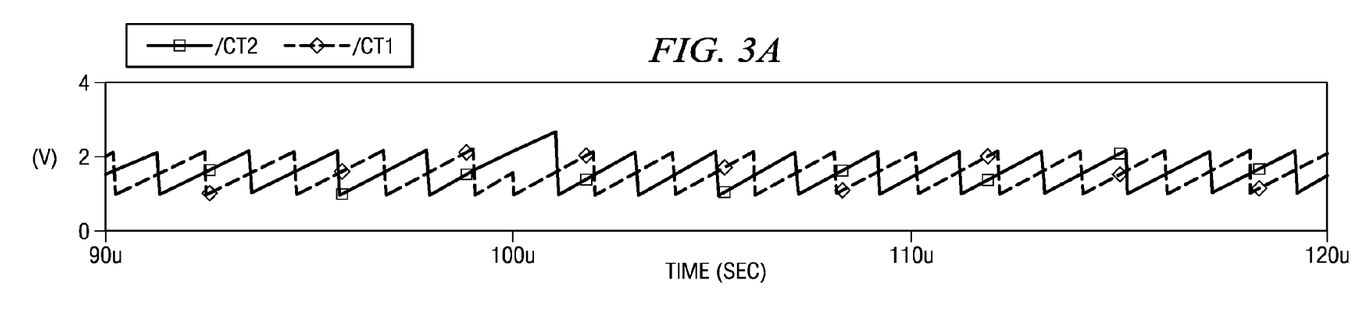
FIG. 3A shows a waveform of voltage vs. time for module 1 of the FIG. 2 implementation.
Figure 3B:
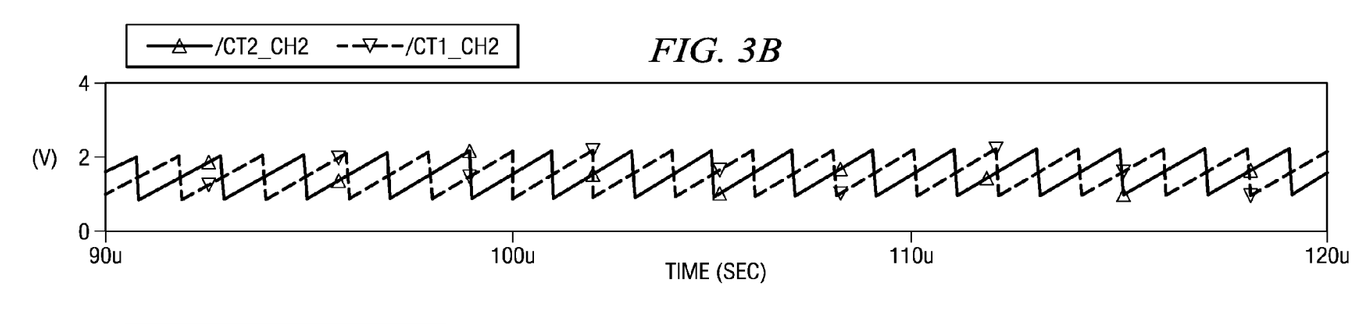
FIG. 3B shows a waveform of voltage vs. time for module 2 of the FIG. 2 implementation.
Figure 3C:
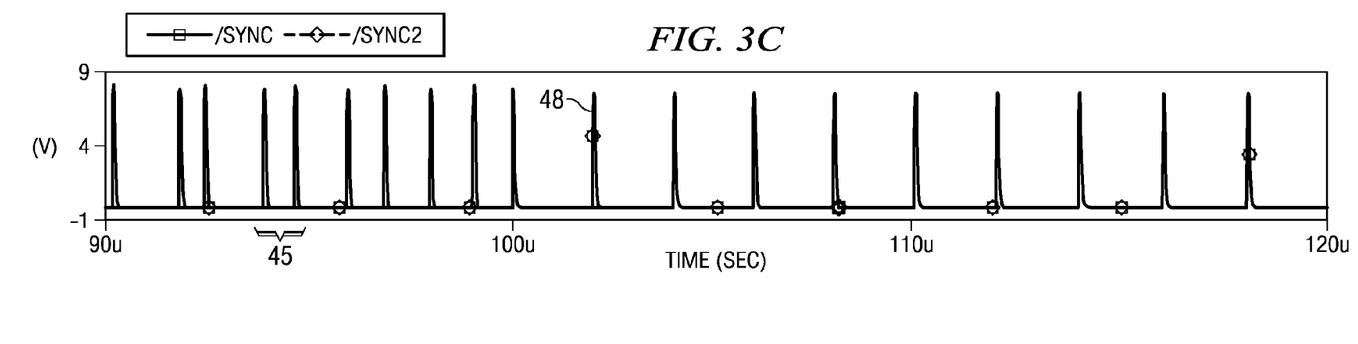
FIG. 3C shows a synchronization waveform of voltage vs. time for modules 1 and 2 of the FIG. 2 implementation.

Results The results and effect of the system 10 and synchronization circuitry 20 are shown in the voltage waveforms in FIGS. 3A to 3C. FIG. 3A shows a voltage (V) versus time (t) waveform at the RC node for a first power module operating alone at a first frequency (about 300 kHz). The saw-toothed waveforms are 180 degrees out of phase. FIG. 3B shows a voltage versus time waveform at the RC node for a second power module at a different, second frequency (about 310 kHz). The saw-toothed waveforms of the second power module likewise are 180 degrees out of phase.

Figure 4:
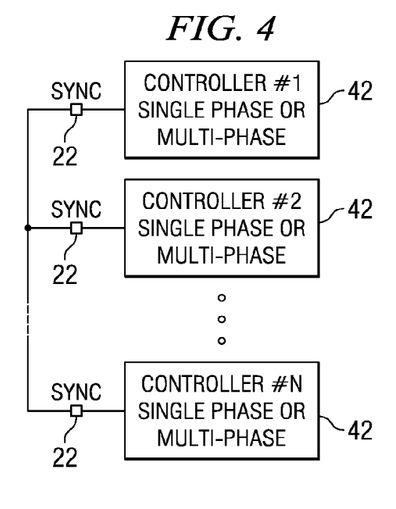
FIG. 4 is a block diagram of multiple converter/controllers connected to sync nodes.

Referring to FIG. 3C, a pulse train waveform at the synchronization node is shown. Between time t=90 μsec and time t=100 μsec, two distinct peaks 45, corresponding to individual discharging of the first and second power modules, are shown that are slightly out of phase. At time t=100 μsec, the two power modules 42 having the disclosed system 10 and synchronization circuitry 20 were connected at a common synchronization node 22 (FIG. 4). As shown in FIG. 3C, the two, out of phase peaks 45 of the pulse train waveform have been synchronized into a single, in phase peak 48.

Figure 5:
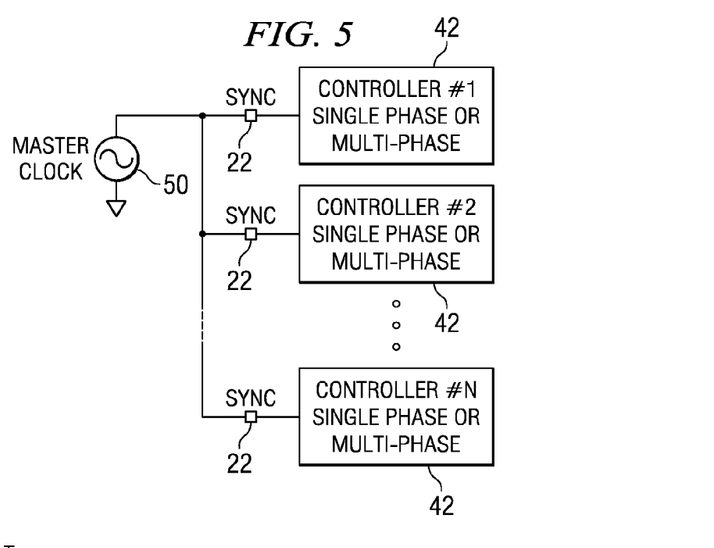
FIG. 5 is a block diagram of multiple converter/controllers connected to sync nodes that are connected to an external master clock.

Although the system 10 and synchronization circuit 20 disclosed herein do not require any external devices and/or the dedication of a single converter/controller 42 as a "master" controller, those skilled in the art could electrically-couple an external master clock 50 to the synchronization node 22 as shown in FIG. 5.

The invention has been described in detail including the preferred embodiments thereof. However, those skilled in the art, upon considering the present disclosure, may make modifications and improvements within the spirit and scope of the invention.

What is claimed is:

1. A controller for power converter comprising:
   a first voltage rail;
   a pin that is adapted to receive a synchronization signal;
   a synchronization circuit including:
   a first switch that is coupled to the first voltage rail, wherein the first switch includes a control electrode;
   a first resistive element that is coupled between the first switch and the pin;
   a second switch that is coupled to ground, wherein the second switch includes a control electrode; and
   a second resistive element that is coupled between the second switch and the pin;
   a pulse generator that is coupled to the pin;
   a logic circuit that is coupled to the pulse generator;
   an oscillator including:
   a latch having a set input, a reset input, and an output, wherein the set input is coupled to the logic;
   an RC network having a third switch and an RC node, wherein the third switch is coupled to the output of the latch at its control electrode;
   a first comparator having a first input, a second input, and an output, wherein the first input of the first comparator is coupled to the RC node, and wherein the output of the first comparator is coupled to the logic circuit and to the control electrodes of the first and second switches, and wherein the first comparator compares the voltage at the RC node to a first threshold voltage;
   a second comparator having a first input, a second input, and an output, wherein the first input of the second comparator is coupled to the RC node, and wherein the output of the second comparator is coupled to the reset input of the latch, and wherein the second comparator compares the voltage at the RC node to a second threshold voltage.

2. The controller as recited in claim 1, wherein the pulse generator is adapted to detect a rising edge and to generate a pulse once the rising edge is detected.

3. The controller as recited in claim 2, wherein the logic circuit further comprises an OR gate having an input that is coupled to the pulse generator and an output that is coupled to the set input of the latch.

4. The controller as recited in claim 1, wherein a pull-up impedance of the first switch and the first resistive element is at least an order of magnitude lower than a pull-down impedance of the second switch and the second resistive element.

5. The controller as recited in claim 4, wherein the pull-up impedance is about 1/10th to about 1/20th the pull-down impedance.

6. The controller as recited in claim 1, wherein the RC network further comprises:
   a resistor that is coupled to the RC node; and
   a capacitor coupled between the RC node and ground.

7. The controller as recited in claim 1, wherein the controller further comprises an inverter that is interposed between the output of the first comparator and the control electrodes of the first and second switches.

8. The controller as recited in claim 1, wherein the controller further comprises a second pulse generator that is coupled to the output of the second comparator, wherein the pulse generator outputs a clock signal.

9. The controller as recited in claim 8, wherein the controller further comprises an inverter that is interposed between the pulse generator and second comparator.

10. An apparatus comprising:
    a first voltage rail;
    a pin that is adapted to receive a synchronization signal;
    a first switch that is coupled to the first voltage rail, wherein the first switch includes a control electrode;
    a first resistive element that is coupled between the first switch and the pin;
    a second switch that is coupled to ground, wherein the second switch includes a control electrode; and a second resistive element that is coupled between the second switch and the pin;

a plurality of pulse generators, wherein at least one pulse generator is coupled to the pin;

a logic circuit that is coupled to at least one pulse generator that is coupled to the pin;

a plurality of latches, wherein each latch includes a set input, a reset input, and an output, and wherein the set input of at least one of the latches is coupled to the logic;

an RC network having a third switch, a fourth switch, a first RC node, and a second RC node, wherein the control electrodes of each of the third and fourth switches is coupled to an output of at least one of the latches;

a first comparator having a first input, a second input, and an output, wherein the first input of the first comparator is coupled to the first RC node, and wherein the output of the first comparator is coupled to the logic circuit and to the control electrodes of the first and second switches, and wherein the first comparator compares the voltage at the first RC node to a first threshold voltage;

a second comparator having a first input, a second input, and an output, wherein the first input of the second comparator is coupled to the first RC node, and wherein the output of the second comparator is coupled to the reset input of at least one of the latches and at least one of the pulse generators, and wherein the second comparator compares the voltage at the first RC node to a second threshold voltage;

a third comparator having a first input, a second input, and an output, wherein the first input of the third comparator is coupled to the first RC node, and wherein the output of the third comparator is coupled to the reset input of at least one of the latches, and wherein the second comparator compares the voltage at the first RC node to a third threshold voltage;

a fourth comparator having a first input, a second input, and an output, wherein the first input of the fourth comparator is coupled to the second RC node, and wherein the output of the fourth comparator is coupled to the reset input of at least one of the latches and at least one of the pulse generators, and wherein the fourth comparator compares the voltage at the second RC node to the second threshold voltage.

11. The apparatus as recited in claim 10, wherein each pulse generator is adapted to detect a rising edge and to generate a pulse once the rising edge is detected.

12. The apparatus as recited in claim 10, wherein the logic circuit further comprises an OR gate having an input that is coupled to at least one pulse generator that is coupled to the pin and an output that is coupled to the set input of at least one of the latches.

13. The system apparatus as recited in claim 10, wherein the a pull-up impedance of the first switch and the first resistive element is at least an order of magnitude lower than the a pull-down impedance of the second switch and the second resistive element.

14. The apparatus as recited in claim 13, wherein the pull-up impedance is about 1/10th to about 1/20th the pull-down impedance.

15. The apparatus as recited in claim 10, wherein the RC network further comprises:

an RC circuit that is coupled to the first and second RC nodes;

the first switch, wherein the first switch is a FET that is coupled to the first RC node at its drain and to ground at its source; and the second switch, wherein the second switch is a FET that is coupled to the second RC node at its drain and to ground at its source.

16. The apparatus as recited in claim 10, wherein the apparatus further comprises a level shifting circuit that is coupled to the first and second RC nodes.

17. An apparatus comprising:

a first voltage rail;

a pin that is adapted to receive a synchronization signal;

a synchronization circuit including:

a first switch that is coupled to the first voltage rail, wherein the first switch includes a control electrode;

a first resistive element that is coupled between the first switch and the pin;

a second switch that is coupled to ground, wherein the first switch includes a control electrode; and a second resistive element that is coupled between the second switch and the pin;

a pulse generator that is coupled to the pin;

a logic circuit that is coupled to the pulse generator;

a first oscillator that is coupled to the logic, wherein the first oscillator is adapted to output a first clock signal, and wherein the first oscillator provides a feedback signal to the control electrodes of the first and second switches so as to actuate and deactuate the first and second switches;

a second oscillator that is coupled to the first oscillator, wherein the second oscillator is adapted to output a second clock signal.

18. The apparatus as recited in claim 17, wherein the first oscillator further comprises:

a latch having a set input, a reset input, and an output, wherein the set input is coupled to the logic;

an RC network having a third switch and an RC node, wherein the third switch is coupled to the output of the latch at its control electrode;

a first comparator having a first input, a second input, and an output, wherein the first input of the first comparator is coupled to the RC node, and wherein the output of the first comparator is coupled to the logic circuit and to the control electrodes of the first and second switches, and wherein the first comparator compares the voltage at the RC node to a first threshold voltage;

a second comparator having a first input, a second input, and an output, wherein the first input of the second comparator is coupled to the RC node, and wherein the output of the second comparator is coupled to the reset input of the latch, and wherein the second comparator compares the voltage at the RC node to a second threshold voltage; and a second pulse generator that is coupled to the output of the second comparator, wherein the second pulse generator is adapted to output the first clock signal.

19. The apparatus as recited in claim 18, wherein the first oscillator further comprises an inverter that is interposed between the output of the second comparator and the second pulse generator.

20. The apparatus as recited in claim 17, wherein the apparatus further comprises an inverter that is interposed between the first oscillator and the control electrodes of the first and second switches.

* * * * *